United States Patent
Tsarkova

(10) Patent No.: US 10,009,398 B2
(45) Date of Patent: Jun. 26, 2018

(54) SYSTEM FOR PROVIDING EVENT-RELATED CONTENTS TO USERS ATTENDING AN EVENT AND HAVING RESPECTIVE USER TERMINALS

(71) Applicant: Natalia Tsarkova, Crans Pres Celigny (CH)

(72) Inventor: Natalia Tsarkova, Crans Pres Celigny (CH)

( * ) Notice: Subject to any disclaimer, the term of this patent is extended or adjusted under 35 U.S.C. 154(b) by 148 days.

(21) Appl. No.: 14/389,396

(22) PCT Filed: Mar. 30, 2013

(86) PCT No.: PCT/IB2013/052571
§ 371 (c)(1),
(2) Date: Sep. 30, 2014

(87) PCT Pub. No.: WO2013/144926
PCT Pub. Date: Oct. 3, 2013

(65) Prior Publication Data
US 2015/0067102 A1 Mar. 5, 2015

Related U.S. Application Data

(60) Provisional application No. 61/618,118, filed on Mar. 30, 2012.

(51) Int. Cl.
*G06F 15/16* (2006.01)
*H04L 29/06* (2006.01)
(Continued)

(52) U.S. Cl.
CPC ...... *H04L 65/4084* (2013.01); *G06F 3/04817* (2013.01); *G06F 3/04845* (2013.01);
(Continued)

(58) Field of Classification Search
CPC ..... H04L 65/4084; H04L 51/04; H04L 29/06; H04L 12/58; G06F 3/04817;
(Continued)

(56) References Cited

U.S. PATENT DOCUMENTS

| 2007/0021058 A1* | 1/2007 | Arseneau | G06F 1/1626 455/3.06 |
| 2007/0035612 A1* | 2/2007 | Korneluk | G08B 13/19671 348/14.01 |

(Continued)

*Primary Examiner* — Cheikh Ndiaye
(74) *Attorney, Agent, or Firm* — Womble Bond Dickinson (US) LLP

(57) ABSTRACT

The present invention provides a system for providing event-related contents to users attending an event, comprising: a set of cameras (110, 111, 112) for filming the event, a central unit (120) adapted to receive video streams from said cameras, a plurality or user terminals (140) at the event site, a local wireless network (130) for communications between said central unit and said plurality of user terminals, a source (160) of event-related editorial contents (620) accessible by said central unit, means provided in said user terminals (140) for selectively displaying, through a dedicated user interface (800), video streams and event-related editorial contents provided by said central unit (120) via said local wireless network (130), and content control means (400, 410, 430) provided at said central unit (120) for selectively controlling the nature and contents of the event-related contents accessible by the user terminals as a function of parameters contained in a group comprising time, user terminal localization and triggering events. The present invention further provides associated control room equipment, user terminal and method.

35 Claims, 8 Drawing Sheets

(51) Int. Cl.

| | | |
|---|---|---|
| *H04N 21/218* | (2011.01) | |
| *H04N 21/2665* | (2011.01) | |
| *H04N 21/2743* | (2011.01) | |
| *H04N 21/414* | (2011.01) | |
| *H04N 21/4223* | (2011.01) | |
| *H04N 21/4788* | (2011.01) | |
| *H04N 21/63* | (2011.01) | |
| *G06F 3/0481* | (2013.01) | |
| *G06F 3/0484* | (2013.01) | |
| *H04L 12/58* | (2006.01) | |

(52) U.S. Cl.
CPC ....... *H04L 51/04* (2013.01); *H04N 21/21805* (2013.01); *H04N 21/2665* (2013.01); *H04N 21/2743* (2013.01); *H04N 21/41407* (2013.01); *H04N 21/4223* (2013.01); *H04N 21/4788* (2013.01); *H04N 21/632* (2013.01)

(58) Field of Classification Search
CPC .. G06F 3/04845; G06F 3/0481; G06F 3/0484; H04N 21/21805; H04N 21/2665; H04N 21/2743; H04N 21/41407; H04N 21/4223; H04N 21/632; H04N 21/4788
See application file for complete search history.

(56) References Cited

U.S. PATENT DOCUMENTS

| | | |
|---|---|---|
| 2007/0198738 A1 | 8/2007 | Angiolillo et al. |
| 2009/0009605 A1 | 1/2009 | Ortiz |
| 2009/0063995 A1* | 3/2009 | Baron .................... G06Q 10/10 715/753 |
| 2009/0164484 A1* | 6/2009 | Horowitz ........... H04N 7/17318 |
| 2010/0158315 A1* | 6/2010 | Martin .............. G06F 17/30247 382/103 |

* cited by examiner

SYSTEM FOR PROVIDING EVENT-RELATED CONTENTS TO USERS ATTENDING AN EVENT AND HAVING RESPECTIVE USER TERMINALS

FIELD OF THE INVENTION

The invention relates to the field of events, in particular cultural shows, concerns, sporting events, community events, political events or events of any other type.

BACKGROUND OF THE INVENTION

A normal goal of a live event organizer (promoter or producer) is to improve the user experience and increase the income derived from such an event. The revenues, including but not limited to ticket, merchandise sales and sponsor placement, are known to peak rapidly during the event, and taper off just as quickly the day after. Therefore, the organizer's objective is to increase the experience of the user around the live event schedule, a possible consequence being an increase of the revenues before and after the event.

It is key to note that a live event offers a unique opportunity to marketers, as it brings together proactive customers who express their interest in the artist or subject matter of the event, by spending money to buy a ticket and/or actively going to the venue. This customer is different from a passive TV or Internet viewer. Furthermore, interest in an event allows the marketers to determine the consumer "psychographic" profile, and therefore place advertisements and marketing messages within the context of customer personal taste. Since an event is frequently experienced with buddies, the marketer can not only reach the consumer with personalized messages, but also identify and target his circle of friends.

This traditionally assumes an effective preliminary publicity and communication campaign, but also, more recently, Web promotion. It turns out that customers today want more information about the event: practical information, program information, information on the artist's tour, other participating celebrities, bonuses, private details, exclusive content, and so on.

The customer also wants to participate, give his or her opinion, have discussions in forums around the event and now even become a reporter, not only to comment on this event, but to publish images or videos that he or she has captured with a cellular telephone or smartphone. To do this, the customer visits many sites, blogs, walls or discussion threads where he or she can leave an opinion on the event or the celebrity. For the singer Lady Gaga™ for example, the customer can access the website Ladygaga.fr™ to watch exclusive videos, talk with the artist and her fans on Facebook™, follow the news on Twitter™ and have conversations, even in real time, and see amateur videos recorded at her concerts on YouTube™, and so on.

The spectator, in his or her quest for information, adopts an active approach to research on the Web and him or herself sorts through the information received, between that truly concerning the event and that concerning other past or future events. To satisfy his or her need to communicate, the spectator usually navigates between the sites, services and social networks that he or she visits on a daily basis.

Thanks to the recent developments in social media, one could say that any popular live event begins at a virtual level before the actual show starts, through the interactive exchanges on entertainment and social networking sites. However, there is no centralized platform or technology to enable the fans to experience the virtual "pre-show", in the context of the upcoming event. Clearly, if such a platform were available, it would both provide a service to the fans, and enable the event organizers to extend the show and their revenues along with it.

However, the spectator's activity during the event is usually limited to taking photographs or videos with his or her cellular telephone, or sending simple communications by SMS, even though this is paradoxically the time when his or her desire to communicate is greatest in order to share an exciting moment with friends, the community and even the artist. In practice, the use of telecommunications services is very limited, and videos and photographs are uploaded to the Internet after the event.

The communication and interactivity tools to which the spectator has access during the event indeed have a number of defects:
  frequent transmission service denials: the cumulative bandwidth of public networks does not enable the real-time uploading of video streams coming from a multitude of mobile terminals or their re-broadcasting to an even larger number of terminals.
  problems using the terminal: in a noisy, unruly and poorly lighted environment, the small size of the screen of a smartphone makes intensive use of a multitude of information and services organized in the form of conventional menus difficult. The user just gets tired of navigating and instead concentrates on a few services that he or she is accustomed to and of which he or she has pre-programmed the links for quick access.

SUMMARY OF THE INVENTION

There is therefore a need for a new service enabling one or several of the following:
  the spectator to use the service in his or her participation in the event before, during and after said event;
  a variety of multimedia information (videos, music, playlists, articles, etc.) concerning the event itself, its actors, its content, its media, artistic, sporting or historic environment to be collected for the spectator;
  the spectator to be kept informed in real time about the organizational environment (practical information, free parking, restaurants, transportation, etc.);
  the spectator to find, during the actual event, new information to which he or she did not generally have access during this type of event (slideshows, views of dressing rooms, 'making of' or 'behind the scenes', etc.);
  the spectator to interact directly with the celebrities and actors of the event, for example by asking them questions in the form of flash interviews;
  the spectator to become the reporter of the event by taking photographs, videos and sound using his or her smartphone, which will immediately be broadcast to the other spectators;
  the spectator to communicate with the other spectators, before, during and after the event in a dedicated social network by exchanging comments, opinions, images, videos, sound, etc.;
  the spectator to consult, in real time, messages about the event exchanged on other social networks, such as Twitter™, filtered and reformatted by the system;
  the spectator to link to any other site or service offered by the producer, organizer, partners or sponsors of the event; among these services, the spectator will usually find a shop at which he or she can reserve or buy derivative products associated with the event. If he or she so desires, the spectator may receive the articles at the event that he or she previously reserved and paid for at said shop, simply by presenting his or her smartphone screen;

the spectators to prolong the event, as the excitement of spectators and fans is at its height when the show ends; the next day, fans may search online for opinions and comments concerning the event, send new photographs and videos, and possibly find photographs of themselves among the images published; these pre- and post-event communications would provide an important additional service to the spectator, the producer, the organizer and marketing managers;

any of these in an operational manner, including in the context of a poorly lighted and noisy event.

Therefore, one of the objectives of the invention is to make the spectators' communication tools more effective during an event. A secondary objective is to be capable of organizing customized editorial content according to a number of factors. Another secondary objective is to limit service denials that are inevitable due to the simple use of telecommunication networks by a large number of people in geographic proximity to one another.

To this end, according to a first aspect of the invention a system for providing event-related contents to users attending an event, comprising:

a set of cameras for filming the event,
a central unit adapted to receive video streams from said cameras,
a plurality or user terminals at the event site,
a local wireless network for communications between said central unit and said plurality of user terminals,
a source of event-related editorial contents accessible by said central unit,
means provided in said user terminals for selectively displaying, through a dedicated user interface, video streams and event-related editorial contents provided by said central unit via said local wireless network, and
content control means provided at said central unit for selectively controlling the nature and contents of the event-related contents accessible by the user terminals as a function of parameters contained in a group comprising time, user terminal localization and triggering events.

Preferred but non-limiting aspects of the above system include the following features, taken alone or in any technically-compatible combinations:

the system further comprises, in the user terminals, means for deriving from a received event ticket or associated data, connection information for establishing communications with said central unit.

the system further comprises an editor platform for generating the event-related editorial contents, said editor platform comprising a first editorial module including searching means for searching event-related information from external data sources and for storing said information.

said editor platform comprises a second editorial module including searching means for filtering event-related data flux and for channeling the retrieved flux to said central unit.

said data flux comprise instant messaging flux.

said searching means are capable of using search criteria based on user-profile information.

the system further comprises means for changing user profile information, including profile accessibility, in response to instructions received from user terminals through the local wireless network.

the system further comprises means for changing the editorial contents in response of actions from user terminals transmitted though the local wireless network.

said user terminals further include means for displaying user icons representative of other user terminals connected to the central unit.

said user terminals comprise a graphical user interface allowing to selectively display different information elements about/from the corresponding users.

said information elements about a given user comprise user terminal localization data, messaging threads in which the given user is involved, or video streams generated by a camera of the given user terminal.

the selective display of different information elements is performed according to a specific zone toward which a user icon is dragged.

said user terminals comprise a user interface allowing to display contextual information derived from said editorial platform.

said user interface includes a display of user-actuated keywords.

the system further comprises means for transmitting information captured by user terminals to said central unit, so that said information can be transferred to other user terminals via said central unit and said local wireless network.

said captured information includes video streams.

said video streams include video streams of side scenes of the event such as backstage events and micro-shows.

said captured information includes user-inputted instant messages.

the system further comprises a contextual engine for determining the localization information of said cameras and for selectively displaying said localization information on said user terminals.

said content control means comprise a timeline generation means having a user interface for setting on a time axis triggering events and operating conditions governing said content control means in response to triggering events effectively happening.

the central unit is connected to the source of event-related editorial contents via a network, and further comprising, in the control unit, means for storing a copy of at least part of the event-related editorial contents so as to master the network load.

According to a second aspect, the present invention provides a control room equipment for event broadcasting, comprising a central unit for providing event-related contents to users attending an event, said central unit comprising:

means for receiving video streams from cameras connected to the control room equipment,
means for connection to a local wireless network for communications between said central unit and a plurality of user terminals at the event site,
means for accessing a source of event-related editorial contents adapted to provide event-related contents to said central unit,
means for selectively broadcasting via said local wireless network combined contents comprising video streams and event-related contents,
means for receiving through said local wireless network user-related information elements from user terminals connected to the local wireless network, and content control means for selectively controlling the nature and contents of the broadcast contents as a function of parameters contained in a group comprising time, terminal localization and triggering events.

Preferred but non-limiting aspects of the above control room equipment include the following features, taken alone or in any technically-compatible combinations:

said information elements comprise user terminal localization data, and/or messaging threads in which the user is involved, and/or video streams generated by a camera of the user terminal.

said information elements comprise instructions for changing user profile information, including profile accessibility.

said information elements comprise instructions for changing the editorial contents by the control room equipment.

the equipment further comprises a contextual engine for determining localization information of said cameras.

said content control means comprise a timeline generation means having a user interface for setting on a time axis triggering events and operating conditions governing said content control means in response to triggering events effectively happening.

According to a third aspect, the present invention provides a user terminal having network communications capability, comprising:

means for deriving from event ticket information connection information for connection to a server of event-related contents for a given event, means for connection to said server via a local wireless network deployed at the event, means for displaying the event-related contents received via said local wireless network.

Preferred but non-limiting aspects of the above user terminal include the following features, taken alone or in any technically-compatible combinations:

the terminal comprises means for transferring to said server user profile information.

the terminal further includes means for displaying user icons representative of other user terminals connected to the local wireless network.

the terminal comprises a graphical user interface allowing to selectively display different information elements about/from the users corresponding to the user icons.

said information elements comprise user terminal localization data, messaging threads in which the user is involved, or video streams generated by a camera of the user terminal, received via said local wireless network.

the selective display of different information elements is performed according to a specific zone toward which a user icon is dragged.

said user terminals comprise a user interface allowing to display contextual information received via said local wireless network.

said user interface includes a display of user-actuated keywords.

The present invention further provides a method for providing event-related contents to users attending an event, comprising the following steps:

preparing a source of event-related contents, providing a local wireless network connected to said source and accessible by a plurality of user terminals during the event, at the event site, during the event, filming the event with at least one camera, selectively providing to the user terminals event-related contents and video streams provided by said camera(s), and controlling the nature and contents of the event-related contents as a function of parameters contained in a group comprising time, user terminal location and triggering events.

The method optionally comprises any further step implementing the above-mentioned preferred but non limiting aspects of the system, control room equipment and user terminal.

BRIEF DESCRIPTION OF THE DRAWINGS

The present invention will be more readily understood from the following description of a preferred embodiment thereof, given by way of example and made with reference to the appended drawings, in which.

DETAILED DESCRIPTION OF A PREFERRED EMBODIMENT

1) Definitions

Figure 1:
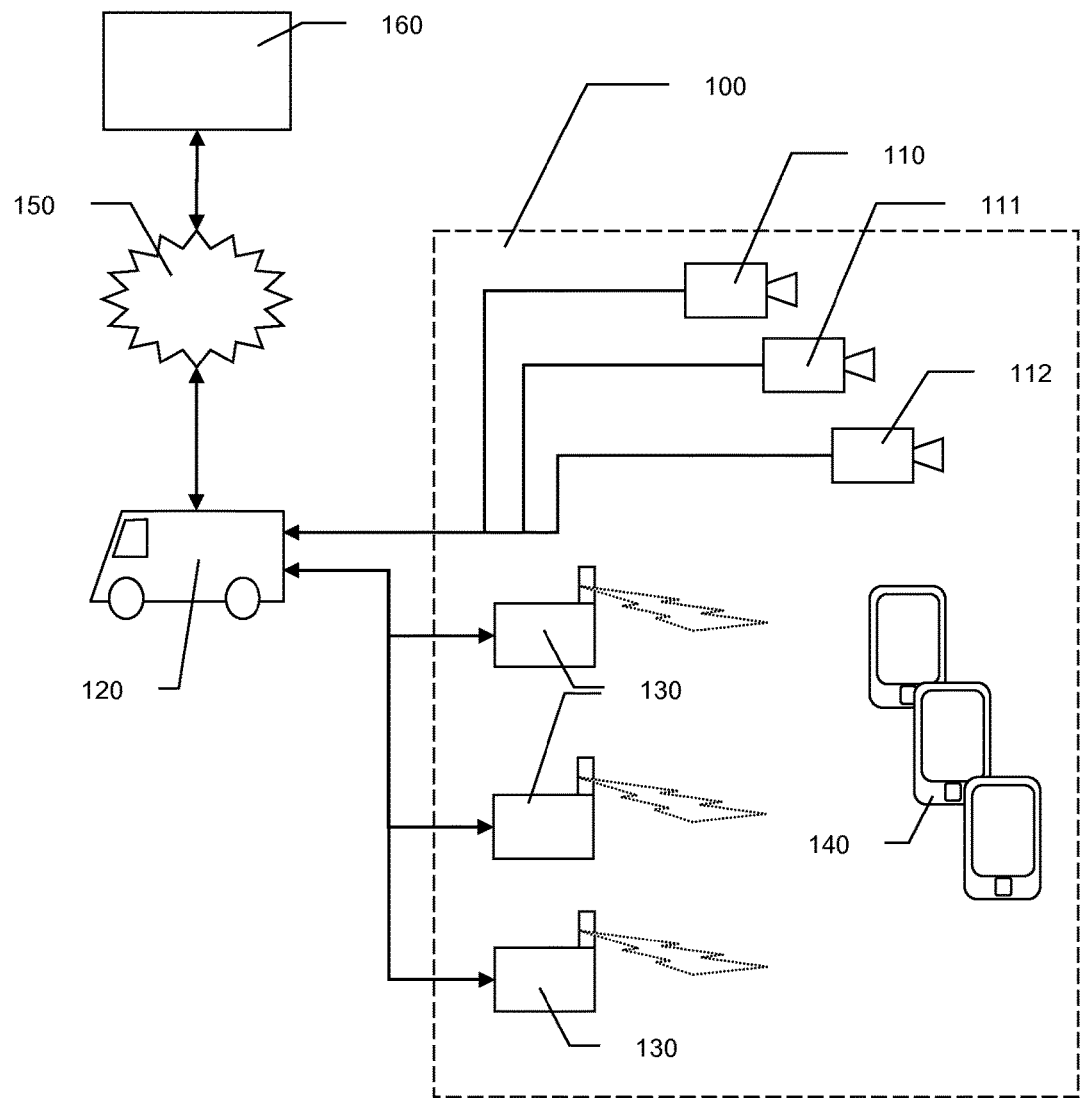
FIG. 1 is an overview of an event site together with an associated system according to the present invention, FIG. 2 diagrammatically illustrates an interaction between a user's smartphone and a ticket for the event, FIG. 3 diagrammatically illustrates an editor equipment for generating a unified Web reception space associated to an event, FIG. 4 diagrammatically shows a control module and its connection with the equipment.

Event: any public event, whether it is a cultural show, a concert, a sporting event, a community event, a political event or an event of any other type of event.

Celebrity: any person or group of people (musical group, theatre troupe, sporting team, etc.) known to the public.

Editor: the person who publishes the editorial contents of the service, or ensures or supervises the animation and moderation thereof; the editor may be directed by the producer, the organizer or any other partner of the event.

User: a spectator of the event having an entrance ticket and who has opted to use the service, whether it is free, included in the price of the ticket or billed as an additional fee.

Triggering event: a single happening, expected or not (arrival of a celebrity, for example), a random phenomenon (arrival of rain, for example), an incident (illness of a person in public, for example) that synchronizes the event and that the editor can take into account or use in the programming of timelines in order to trigger actions.

Action: in the context of the organization of an event, an action is triggered by the programming or updating in real time of a timeline; it can involve the modification of a navigation menu, the turning on or off of a section, the transition between a screen format and another format on the general homepage or the homepage of a section, the starting or stopping of the video broadcast, etc.

Timeline: a means for displaying, on a time scale, a list of triggering events in the chronological order in which they occurred or in the chronological order in which they should occur; according to the present invention, a timeline also is a means for programming and displaying, on a time scale, actions such as turning an information section on or off, and transitions between different Web screen display formats of the various sections; these actions can be positioned absolutely in time (example d-3 is three days before the event), or relatively with respect to the occurrence of a triggering event or the value of a criterion (for example, the appearance of an artist, the arrival of rain, etc.).

Editorial Filters: Editorial filters are used to align the media and data within the timeline, to push certain media on the consumer terminals, to help consumer navigate within a large choice of media and messages, and to push relevant personalized data (including marketing messages) to the consumer within the context of his experience. Such filters can be static (i.e. geolocalization, camera position, specific event with a show) and dynamic/contextual (specific data we have about the fan, such as his musical preference, age or taste; action triggers, such as posting a picture or making a comment; timeline triggers, such as sending a personalized message before the show begins, etc).

Proxy: in the context of the invention, a proxy server is a server hardware hosting a client-server computer application designed to relay requests between the user terminals and the main application server. Its role is to accelerate the user requests and minimize traffic between the event site and the main application server by locally storing large media elements. Its presence results in the reduction in traffic on the network, thereby increasing the number of users with equal bandwidth.

2) System Description

Now referring to FIG. 1, at an event site 100, a mobile or stationary control room 120 receives the images from one or more cameras—backstage camera 110, 'making of' camera 111, camera facing the public 112, etc. The control room broadcasts these images by streaming e.g. via a local Wi-Fi-based radio network implemented by a plurality of Wi-Fi bases 130 to mobile terminals belonging to the users/spectators 140.

The control room 120 is also connected via a network 150 to a Web server 160. The control room 120 can include a total or partial image proxy server of the server 160 if the traffic volume requires it. The terminals of the user-spectators 140 can thus communicate and interact with the server 160 via the control room 120 and its proxy server and via the network 150. This connection is an alternative to those offered by the telecom operators also servicing the site 100, which enable the server 160 to be reached directly.

The topology of the local Wi-Fi network implemented by the bases 130 is such that it enables the control room 120 to integrate a contextual engine allowing geolocalization of the terminals. It comprises, in particular, preferably a minimum of three cells.

Figure 2:
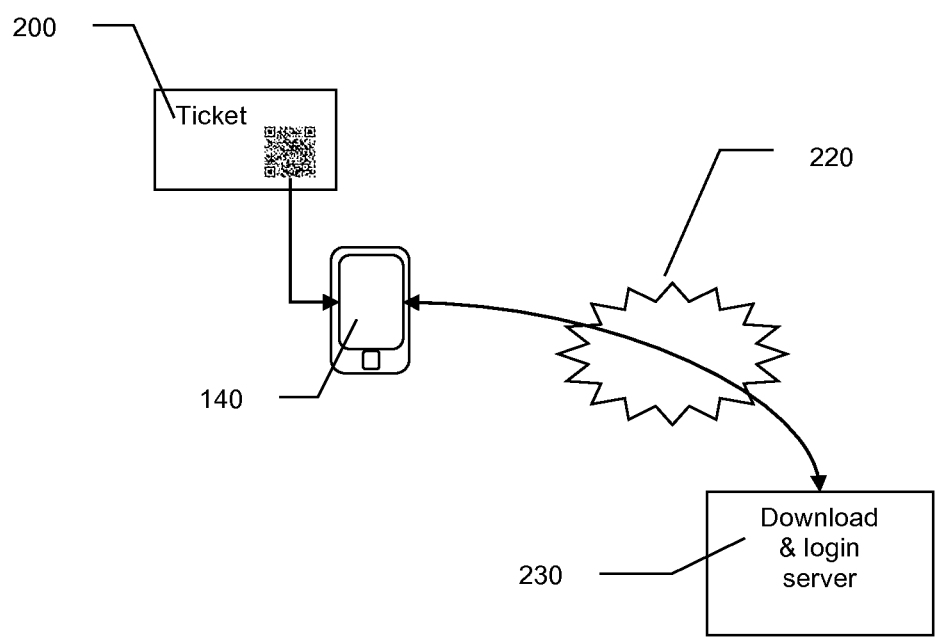

Turning now to FIG. 2, a spectator wishing to become a user of the system receives a ticket 200 containing a machine-readable code, preferably a printed optical code (a QR code, for example), which can be read by his or her smartphone 210. This coded image must contain at least the address of the server (URL) and an identification of the event. Other techniques (magnetic strip, NFC tag, barcode, etc.) can of course be used for implementing the code.

The reading of this code enables the smartphone 210 to connect to a server 230 by means of the network 220 in order to download an application specific to the service.

The reading of this code can also enable the user to identify him or herself at the server in the first access and every subsequent access without needing to type a personal identifier or password. This identification can be done by simultaneous transmission of the identifier of the event contained in the code image and the unique identifier (IMEI) of the smartphone terminal.

Figure 3:
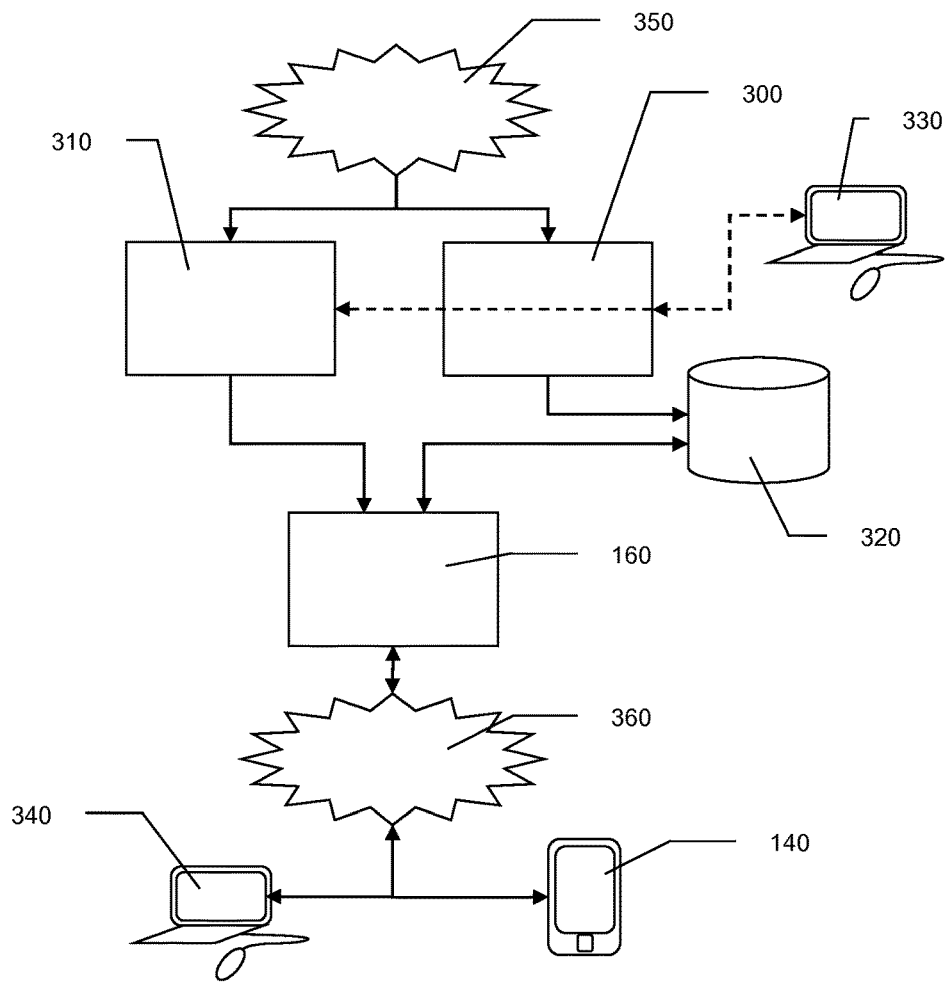

FIG. 3 illustrates an editor platform for generating a unified Web reception space associated to an event. The system includes a first editor module 300 connected to the Web 350, which collects information therefrom concerning the event and its context. The information collected or the links (URLs) enabling it to be accessed are recorded in a database 320.

A second editor module 310 of the editor platform is also connected to the Web 350 and collects information therefrom, which it filters and re-broadcasts in real time to the server 160.

An editor terminal 330 has functions enabling him an editor to parameterize the functions and filters in modules 300 and 310 so as to select the information that will be stored in the database 320 by the module 300 and those that will be filtered and broadcast in real time by the module 310.

A user consults the stored and broadcast information by connecting his or her terminal 340 or 140 to the server 160 via a network 360.

Figure 4:
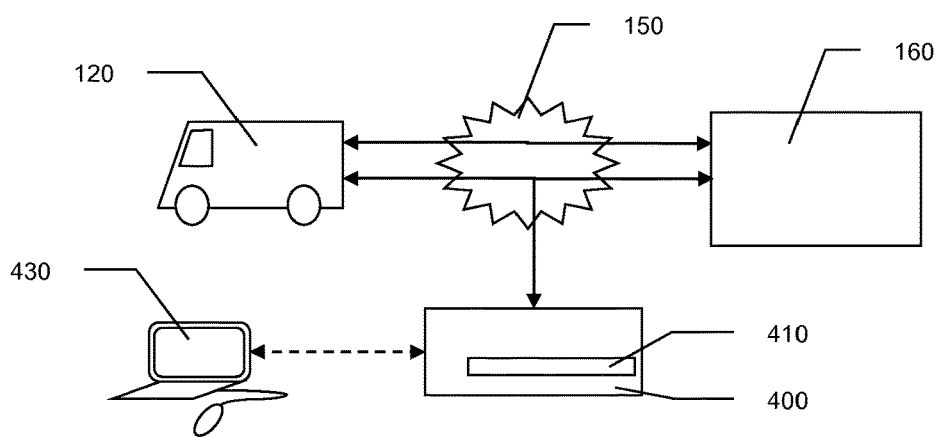

Now referring to FIG. 4, during the event, the control room 120 is connected to the server 160 via the network 150. The control room 120 can include a total or partial image proxy server of server 160.

A control module 400 enables the editor to manage one or more timelines 410 via a terminal 430. These timelines 410 enable the triggering of actions, such as, for example, the opening or closing of the different service sections offered to the users by the server 160 and the control room 120 to be parameterized in time.

During the event, this control module 400 is preferably located in the control room 120.

Figure 5:
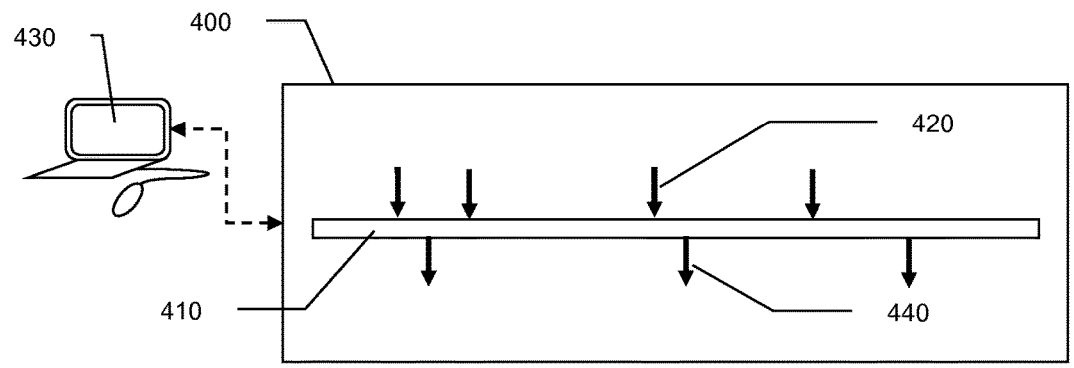
FIG. 5 illustrates a timeline generation in connection with the system.

Referring now to FIG. 5, the timeline(s) 410 of the control module 400, which is/are managed and administered by the editor via terminal 430, enable different actions, such as opening different services offered to the users according to the time and occurrence of triggering events, to be parameterized in time.

The editor, using input devices of terminal 430, positions, on a timeline displayed on a display device of the terminal, triggering events 420, which will trigger actions 440 by applying programming rules.

Figure 6:
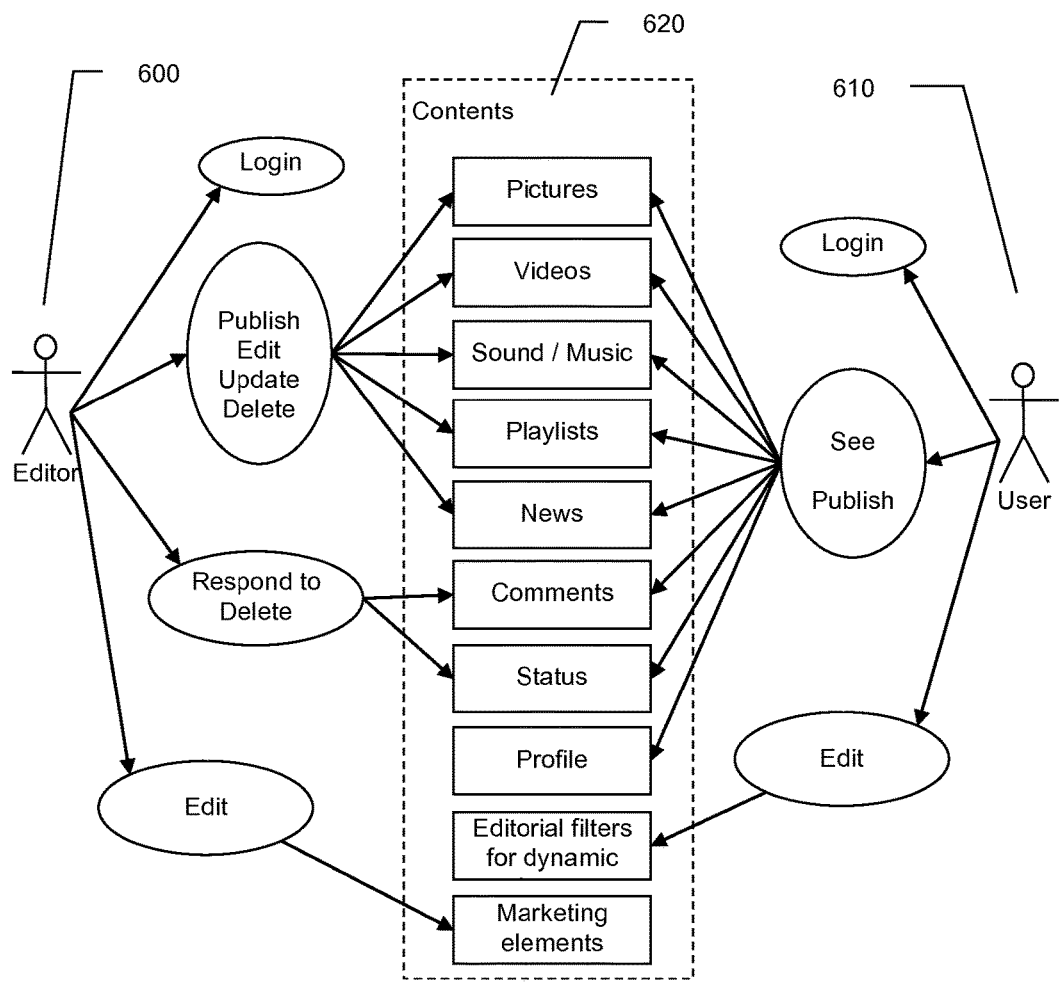
FIG. 6 is a diagram of the main actions from an editor and from users on an editorial content.

FIG. 6 is a diagram of the main functionalities of the editor 600 and users such as 610 on an editorial content 620.

After identifying him or herself (Login), the editor 600 can, by an appropriate user interface publish, edit, update or delete all or part of the editorial content 620. He or she can also respond to comments by the users and, if necessary, suppress interventions on the service that he or she considers to be inappropriate.

After identifying him or herself (Login), the user 610 can consult the editorial content 620 and contribute to it by publishing comments or additional editorial content. He or she can also publish and manage his or her profile and data.

Figure 7:
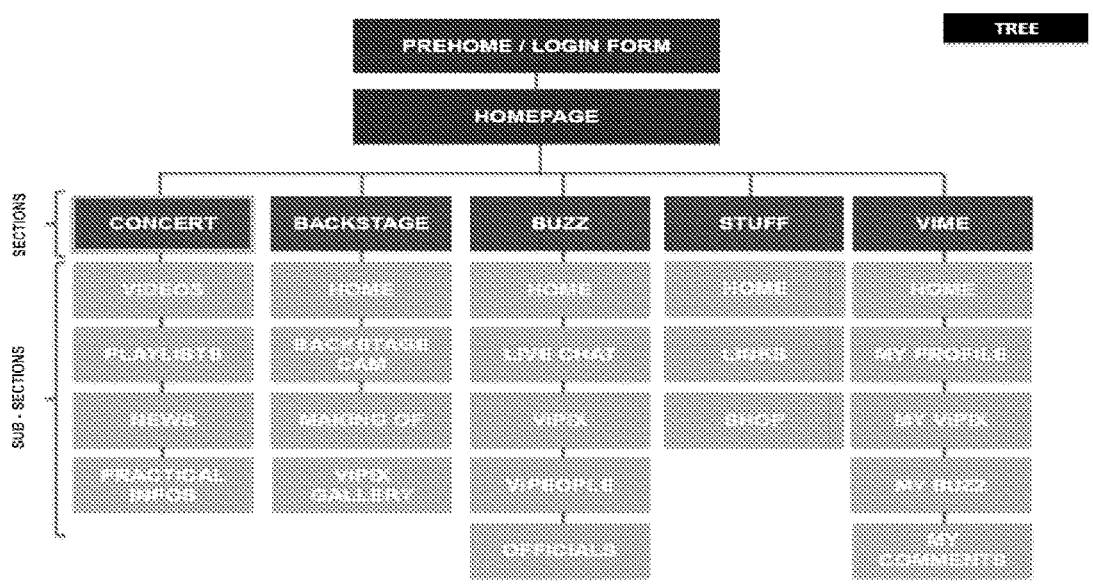
FIG. 7 illustrates a menu structure for a user terminal connected to the system, FIG. 8 diagrammatically shows an exemplary display on a user terminal connected to the system.

FIG. 7 is an example of the structuration of editorial content of the service and menus that enable a user 610 to access said service. The access rights to these menus are dependent on the type of terminal used. Certain menus may, for example, be reserved for access from a smartphone. These access rights may be controlled by one of the timelines managed by the editor (see FIG. 4 and FIG. 5).

Figure 8:
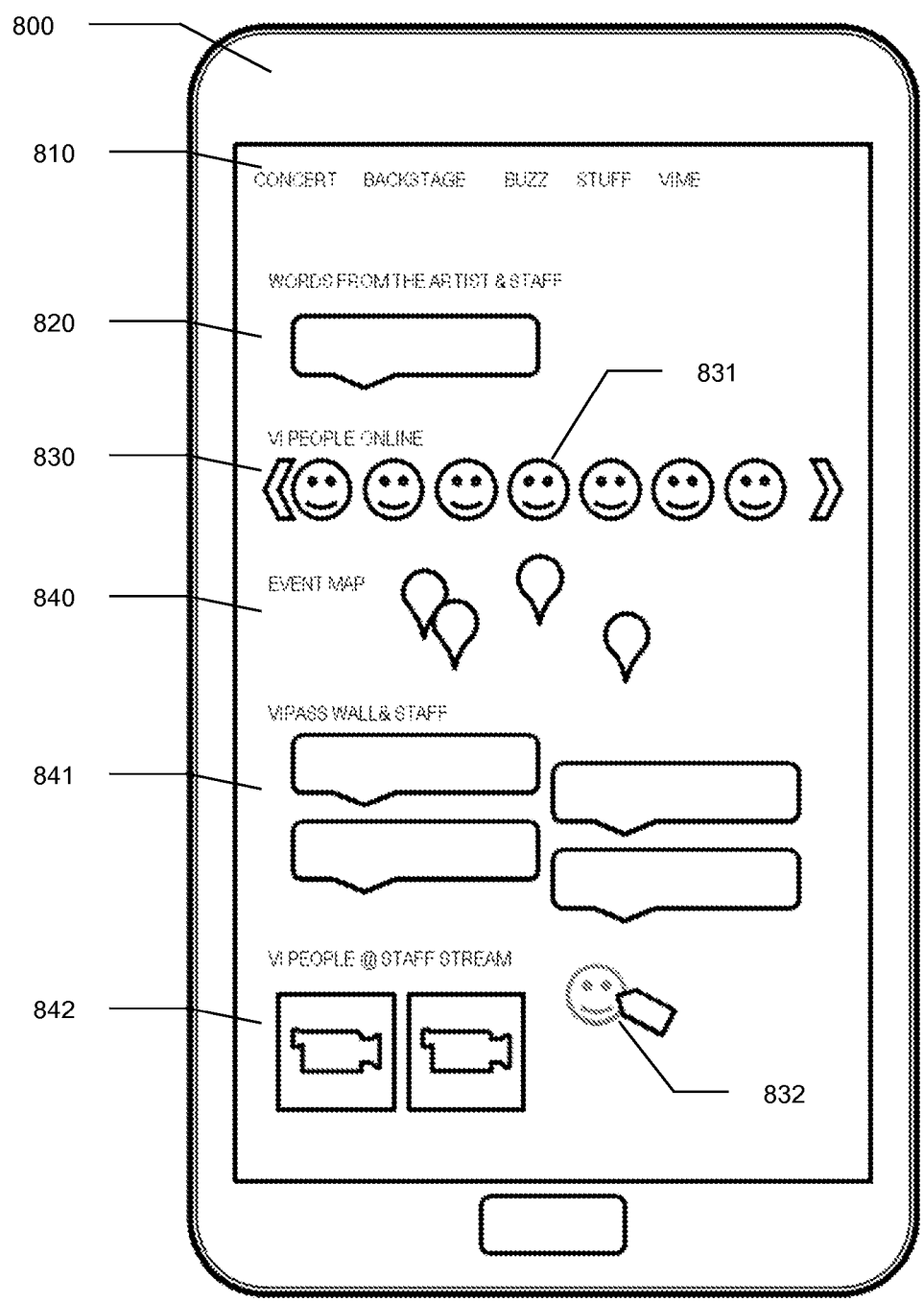

FIG. 8 shows an example of a display 800 of a section of the service on a smartphone or tablet. This display comprises a menu area 810, an area 820 for displaying messages from the editor, an area 830 for displaying icons representing the users who are online, areas 840, 841 and 842 for displaying and receiving sliding/moving movements. The user can move toward one of these areas 840, 841, 842 any of the icons 831 in area 830. The icon 832 is an example of such a movement toward area 842.

A movement of an icon 831 toward area 840 causes the display of the current geolocalization of the smartphone associated to this user. A movement of an icon 831 toward area 841 causes the display of the discussion thread transmitted by this user. A movement of an icon 831 toward area 842 causes the display of images or video streams transmitted by this user.

Figure 9:
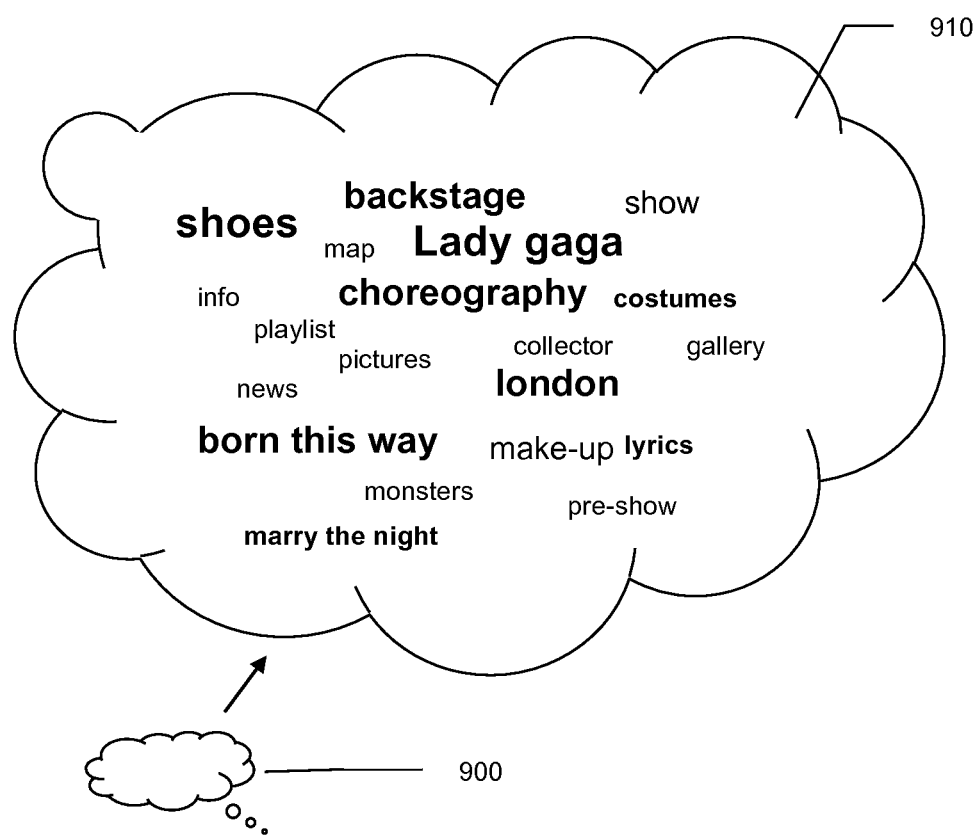
FIG. 9 illustrates a contextual navigation function offered to the user on the user terminal.

FIG. 9 shows a contextual navigation function offered to the user. Regardless of the menu that he or she has chosen and the type of information that he or she is consulting, this function allows the user to see on the display of his or her terminal an icon 900 called a "Trend" icon. An action on this icon (touch or click) causes the display of a contextual navigation guide in the form of a keyword cloud 910. This word cloud 910 is constructed by taking into account the frequency of appearance of each word in the current consultation context. An action on one of the keywords (touch or click) causes the display of editorial content elements concerned.

Figure 10:
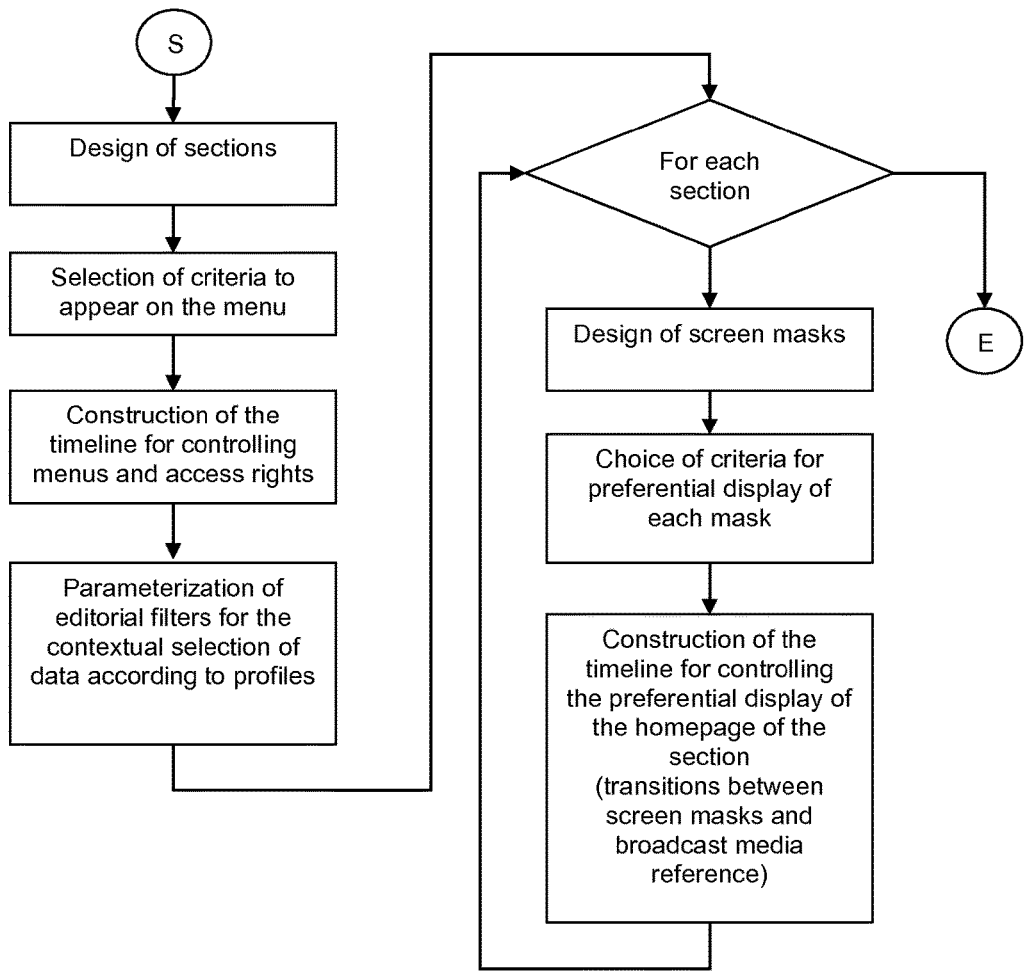
FIG. 10 illustrates a general process of timeline generation, editorial filter parameterization and screen mask design in a system according to the present invention.

FIG. 10 describes a general process of construction of timelines and a dynamic layout for the management of menus, options and specific content elements provided to the user. The appearance or not of different sections in the menu as well as the form of the homepages of each of these sections is dependent on the choice of a certain number of criteria and the value of these criteria at a given moment. The rules for management and consideration of these criteria are recorded in timelines documents 410 managed by the control module 400 (see FIGS. 4 and 5).

The programming of editorial filters also enables editorial content adapted to the profile of the user to be selected dynamically in real time, including advertising content.

3) Unified Web Reception Space and Construction of the Editorial Content

As indicated, the editorial content is collected and partially hosted in server 160 which is accessed by the users in order to enter the service via a unified Web reception space, unique to the event.

The first editor module 300 includes a metasearch engine which, by a series of keywords programmed by the editor, generates Web searches for all information and services that appear to be relevant to the programmed event. The editor validates these elements, keeps them or discards them according to their interest. According to their type and associated copyrights, the editor stores in the local database 320 either the contents themselves or links to the servers hosting the contents. The editor can, if necessary, reformat the information, reframe it or adjust its format. This module can advantageously include a function for semantic analysis of the content in order to assist the editor in his or her task.

The second editor module 310 associated with this Web reception space makes it possible, by a series of keywords programmed by the editor, to search for and filter messages related to the event, exchanged on social networks of which the list is predefined and programmed by the editor. In the example of the Twitter™ network, the editor can program, in addition to the filtering keywords, the list of Hash Tags and addresses to be watched, preferred or avoided (blacklist). The messages thus collected are identified by flux codes depending on their origin. These fluxes may be open or closed at times determined by the editor, by programming a corresponding timeline 410 in the control module 400.

4) Connection, Reception and Identification of Users

A user according to the above description is a spectator who has opted for the services offered by the present invention. He or she receives a ticket 200 for entrance to the event, which includes identification and address data for the server hosting the Web reception space. This data can be recorded on the ticket, for example by a two-dimensional printed code image (a QR code, for example).

This optical code contains at least the address of the server (URL) that hosts the unified Web reception space and a unique identifier of the event concerned.

By reading this code by means of the camera integrated in his or her smartphone, the user can connect to the server 230 that hosts the unified Web reception space of the event and download an application specific to the service if it is not already installed on the smartphone.

In a first embodiment, the user provides, when purchasing his or her ticket for entrance to the event, a unique identifier that can, for example, be his or her email address. At each connection, the user is identified by this unique identifier and by a password that he or she has programmed or modified since the first access. The code printed on the entrance tickets can, in this embodiment, be the same on all of the tickets.

In a second embodiment, the code is different on each ticket and contains, in addition to the address of the server and the identifier of the event, a unique identifier of the ticket. In this embodiment, the application downloaded to the user's smartphone transmits to the server, in each connection, the identification of the event, the identification of the ticket and a user ID such as the unique identifier (IMEI) of the smartphone. In this embodiment, the user does not have to enter anything in order to connect via his or her smartphone. If the user also wants to connect by means of a standard Web browser (i.e. not using the specific application on his or her smartphone), he or she will have to provide a unique identifier (email address, for example) and a password in his or her profile.

The connection and identification via a standard Web browser is done in all of the embodiments by typing a unique identifier (email address, for example) and password recorded in the user profile.

5) Receiving, Formatting and Re-Broadcasting Media Streams in Real Time

During the event, cameras 110, 111, 112 are distributed at the event site: backstage camera, 'making of' camera, public camera, etc.

The video streams captured by these cameras are transmitted to the mobile control room 120. This control room 120 also receives the media elements captured by the user-spectators by means of their smartphones 140, via the local Wi-Fi network. The control room 120 is connected to the server 160 that hosts the Web reception space via network 150 and can collect the media elements therefrom. The control room has functionalities allowing mixing all of these media elements so as to construct, in real time, one or more "micro-shows".

These "micro-shows" are thus produced by integrating previously recorded media elements, media elements collected on the Web, and in particular media elements coming from cameras distributed around the event site and coming from user-spectators who have become reporters owing to the camera on their smartphones 140. They can include comments and observations exchanged in real time on the site or on other social networks, micro-interviews conducted by the users, and so on.

These "micro-shows" associated with metadata (author, section, type, time, geolocalization, etc.) are uploaded to a proxy server integrated with the control room 120 and stored therein so as to be re-broadcast to the smartphone terminals 140 of the users present at the event site.

6) Service Access

A spectator can access the service from a regular-sized terminal via a Web browser or from a mobile terminal with a small screen, via the specific application.

The consultation of a large amount of information concerning the event from a regular-sized terminal does not present any specific problems.

However, the consultation from a mobile terminal may be discouraging for spectators. It is therefore useful, in order to maintain the spectator's interest, to provide a pleasant and guided approach.

The conventional 'navigation' approach consists of providing a fixed menu, such as the one shown in FIG. 7, and keyword search areas. An aspect of the present invention comprises adapting this menu, the sections thereof the homepages of these sections according to a number of criteria.

The first of these criteria is the type of terminal: the sections proposed for consultation via a standard Web browser are different from the sections provided for consultation via the smartphone application. Certain sections and functions are thus reserved for smartphone users present at the event site.

Other criteria are:
- the day and time: the menu may be different before, during or after the event; the availability of parking spaces, for example, is of interest only in the hours preceding the start of the event.
- the geolocalization of the user's terminal: the menu and the sections may be different according to the location of the user; for instance, a user may have access to real-time streams only if he or she is located at the event site, or a user can be prevented from transmitting streams from a reserved area, etc.
- the occurrence of external triggering events 420: the homepage of a section may change upon the arrival of a celebrity, at the start of the show or sporting event, at the intermission of the show or half-time of the sporting event, on the occurrence of an incident or accident, etc.

The actions 440 for putting sections online or taking them offline as well as the transitions between the formats of the homepages of the different sections are programmed on corresponding timelines 410 prepared and managed by the control module 400.

A homepage 800 such as the one shown in FIG. 8 can also provide access, by default, to a "micro-show" generated and broadcast by the control room. By navigating between the different sections, the user can attend and participate in a multitude of parallel "micro-shows" on the sidelines of the event, such as virtually enter the backstage or move around the room. The elements constituting these "micro-shows" are credited to their authors and the geolocalizations of the corresponding cameras can be provided.

To go from one section to another, the user uses the menu 810. To consult associated media elements, the user can use the associated 'Trend' button 900 present in various menu sections to as to display the word cloud 910 of FIG. 9.

In consideration of the size of mobile terminal screens, the viewing of a "micro-show" or any other media element is usually done in full-screen mode. A few navigation icons and in particular the "Trend" 900 icon are kept just at the side or in a corner of the display. An action on this icon (touch or click) causes the contextual word cloud to be displayed. This word cloud is constructed based on the frequency of words describing the media elements associated with the media being viewed.

7) Event Control Module and Timelines

The control module has two main functions:
- before the event, to prepare timeline for management of access rights to the different menu sections (the general timeline), and for transitions between the different forms of the homepages of these sections (section timelines);
- during the event, to control these timelines.

The purpose of the general timeline is to manage the access rights and the turning on and off of the different sections, and the positioning of said sections in the menu.

The purpose of a section timeline is to manage the transitions between different homepage forms and contents in a given section.

The programming of a timeline enables actions to be triggered at a predetermined moment, but also enables the linkage between triggering events and consecutive actions. The occurrence of a triggering event causes the triggering of one or more actions. It is the editor who, via the control module 400, indicates on a given timeline that an external triggering event 420 will occur. The same control module 400 also enables the editor to modify these timelines in real time.

Thus, the menus, the sections and their location in the navigation may depend upon the time or the occurrence of triggering events. Thus, the availability of parking spaces is of interest only when the spectators arrive. Just as an ovation for a friend (birthday, congratulations, etc.) can be triggered when he or she enters the room where people are waiting, the editor will trigger the broadcast of a given sequence upon the arrival of a celebrity.

The form and content of the service can thus be modified in real time by preliminary programming and control of these timelines.

8) Deployment of the Event Site, Mobile Control Room and Geolocalization

As explained, 'micro-shows' are generated in real time from video streams transmitted to control room 120 by cameras 110, 111, 112 distributed around the event site. A Wi-Fi tag on each camera enables its precise localization at the event site to be known. The control room also receives the media elements captured by the users during the event by means of their smartphones 140, and media elements from the server 160 that hosts the Web reception space via a network 150. The control room mixes all of these media elements so as to produce one or more "micro-shows".

The control room 120 can further act as a proxy for server 160 in case of bandwidth constraints in network 150.

In addition, for the duration of the event, the control room 120 hosts the control module 400 of the timelines 410, and ensures the connection with the users/spectators via the Wi-Fi access points 130, sized according to the expected traffic. The topology of the Wi-Fi access points is further designed to enable a geolocalization of the cameras 110, 111, 112 and of the user-spectators 140 with the required accuracy. For this purpose, the control room can use a contextual engine, such as those provided by Cisco, Calif., USA or Appear Networks, Stockholm, Sweden. This contextual engine is capable of correlating the raw coordinates of a terminal with the 3D modeling of the event site.

Of course, the present invention is not limited to the embodiment as described above and shown in the appended drawings, but the skilled person will be able to design numerous variants and modifications.

The invention claimed is:

1. A system for providing event-related contents to users attending an event, comprising:
    a set of cameras for filming the event,
    a central unit adapted to receive video streams from said cameras,
    a plurality of user terminals at the event site,
    a local wireless network for communications between said central unit and said plurality of user terminals,
    a source of event-related editorial contents accessible by said central unit,
    a display unit provided in each of said user terminals and capable of selectively displaying, through a dedicated user interface, video streams and event-related editorial contents provided by said central unit via said local wireless network,
    a derivation unit provided in each of said user terminals for deriving from a received event ticket or associated data connection information for establishing communications with said central unit,
    a content control unit provided at said central unit and comprising:
        a timeline generation and management sub-unit for generating and storing timeline program information for defining accessibility by connected user terminals to contents and services selectively accessible as a function of time and in response to user terminal geolocalization information, user profile information and triggering events or programmed actions related to the event, and for transmitting to said user terminals corresponding accessibility information such as menu changes or turning on/off of display sections so that they can request access only to the accessible contents and services,
        an access control sub-unit for providing accessibility to selected contents and services to connected user terminals in response to the execution of timeline programs as a function of the actual time and of the occurrence of triggering events.

2. A system according to claim 1, further comprising an editor platform for generating the event-related editorial contents, said editor platform comprising a first editorial module including a search engine for searching event-related information from external data sources and for storing said information.

3. A system according to claim 2, wherein said editor platform comprises a second editorial module including a search engine for filtering event-related data flux and for channeling the retrieved flux to said central unit.

4. A system according to claim 3, wherein said data flux comprises instant messaging flux.

5. A system according to claim 2, wherein said search engine is capable of using search criteria based on user-profile information.

6. A system according to claim 5, further comprising a user profile management unit for changing user profile information, including profile accessibility, in response to instructions received from user terminals through the local wireless network.

7. A system according to claim 1, further comprising an editorial contents management unit for changing the editorial contents in response of actions from user terminals transmitted though the local wireless network.

8. A system according to claim 1, wherein said user terminals further include a display unit capable of displaying user icons representative of other user terminals connected to the central unit.

9. A system according to claim 8, wherein said user terminals comprise a graphical user interface allowing to selectively display different information elements about/from the corresponding users.

10. A system according to claim 9, wherein, said information elements about a given user comprise user terminal localization data, messaging threads in which the given user is involved, or video streams generated by a camera of the given user terminal.

11. A system according to claim 10, wherein the selective display of different information elements is performed according to a specific zone toward which a user icon is dragged.

12. A system according to claim 1, wherein said user terminals comprise a user interface allowing to display contextual information derived from said editorial platform.

13. A system according to claim 12, wherein said user interface includes a display of user-actuated keywords.

14. A system according to claim 1, further comprising transmission units provided in user terminals for transmitting information captured by said user terminals to said central unit, so that said information can be transferred to other user terminals via said central unit and said local wireless network.

15. A system according to claim 14, wherein said captured information includes video streams.

16. A system according to claim 15, wherein said video streams include video streams of side scenes of the event such as backstage events and micro-shows.

17. A system according to claim 14, wherein said captured information includes user-inputted instant messages.

18. A system according to claim 1, further comprising a contextual engine for determining localization information of said cameras and for selectively displaying said localization information on said user terminals.

19. A system according to claim 1, wherein said timeline generation and management sub-unit has a user interface for setting on a time axis triggering events and operating conditions governing said content control unit in response to triggering events effectively happening.

20. A system according to claim 1, wherein the central unit is connected to the source of event-related editorial contents via a second network, and further comprising, in the central unit, a storage unit capable of storing a copy of at least part of the event-related editorial contents, whereby a load of said second network is controlled.

21. A control room equipment for event broadcasting, comprising a central unit for providing event-related contents to users attending an event, said central unit comprising:
  a video stream receiving unit for receiving video streams from cameras connected to the control room equipment,
  a connection unit for connection to a local wireless network for communications between said central unit and a plurality of user terminals at the event site,
  an access unit for accessing a source of event-related editorial contents adapted to provide event-related contents to said central unit,
  a broadcast unit for selectively broadcasting via said local wireless network combined contents comprising video streams and event-related contents,
  a user-related information receiving unit for receiving through said local wireless network user-related information elements from user terminals connected to the local wireless network, and
  a content control unit provided in said central unit and comprising:
    a timeline generation and management sub-unit for generating and storing timeline program information for defining accessibility by connected user terminals to contents and services selectively accessible as a function of time and in response to user terminal geolocalization information, user profile information and triggering events or programmed actions related to the event, and for transmitting to said user terminals corresponding accessibility information such as menu changes or turning on/off of display sections so that they can request access only to the accessible contents and services,
    an access control sub-unit for providing accessibility to selected contents and services to connected user terminals in response to the execution of timeline programs as a function of the actual time and of the occurrence of triggering events.

22. A control room equipment according to claim 21, wherein said information elements comprise user terminal localization data, and/or messaging threads in which the user is involved, and/or video streams generated by a camera of the user terminal.

23. A control room equipment according to claim 21, wherein said information elements comprise instructions for changing user profile information, including profile accessibility.

24. A control room equipment according to claim 21, wherein said information elements comprise instructions for changing the editorial contents by the control room equipment.

25. A control room equipment according to claim 21, further comprising a contextual engine for determining localization information of said cameras.

26. A control room equipment according to claim 21, wherein said content control unit comprises a timeline generation module having a user interface for setting on a time axis triggering events and operating conditions governing said content control unit in response to triggering events effectively happening.

27. A user terminal having network communications capability, comprising:
  a derivation unit for deriving from event ticket information connection information for connection to a server of event-related contents for a given event, said server being connected to a control room equipment according to claim 21,
  a connection unit for connection to said server via a local wireless network deployed at the event,
  a display unit capable of displaying accessibility information for selectively accessing event-related contents to be received via said local wireless network from the central unit of said control room equipment, and
  a content access unit for selectively accessing contents and services made accessible by said content control unit provided at said central unit.

28. A user terminal according to claim 27, comprising a user-profile information transfer unit for transferring to said server user profile information.

29. A user terminal according to claim 27, further including a display unit capable of displaying user icons representative of other user terminals connected to the local wireless network.

30. A user terminal according to claim 29, comprising a graphical user interface allowing to selectively display different information elements about/from the users corresponding to the user icons.

31. A user terminal according to claim 30, wherein, said information elements comprise user terminal localization data, messaging threads in which the user is involved, or video streams generated by a camera of the user terminal, received via said local wireless network.

32. A user terminal according to claim 30, wherein the selective display of different information elements is performed according to a specific zone toward which a user icon is dragged.

33. A user terminal according to claim 27, wherein said user terminals comprise a user interface allowing to display contextual information received via said local wireless network.

34. A user terminal according to claim 33, wherein said user interface includes a display of user-actuated keywords.

35. A method for providing event-related contents to users attending an event, comprising the following steps:
  preparing a source of event-related contents,
  providing a local wireless network connected to said source and accessible by a plurality of user terminals during the event, at the event site,
  establishing communications between said user terminals and said wireless network based on information connection derived from a received event ticket or associated data,
  during the event, filming the event with at least one camera,
  selectively providing to the user terminals event-related contents and video streams provided by said camera(s),
    providing timeline program information for defining accessibility by connected user terminals to contents and services selectively accessible as a function of time and in response to user terminal geolocalization information, user profile information and triggering events or programmed actions related to the event, and for transmitting to said user terminals corresponding accessibility information such as menu changes or turning on/off of display sections so that they can request access only to the accessible contents and services, providing accessibility to selected contents and services to connected user terminals in response to the execution of timeline programs as a function of the actual time and of the occurrence of triggering events.

* * * * *

UNITED STATES PATENT AND TRADEMARK OFFICE
CERTIFICATE OF CORRECTION

| | | |
|---|---|---|
| PATENT NO. | : 10,009,398 B2 | Page 1 of 1 |
| APPLICATION NO. | : 14/389396 | |
| DATED | : June 26, 2018 | |
| INVENTOR(S) | : Natalia Tsarkova | |

It is certified that error appears in the above-identified patent and that said Letters Patent is hereby corrected as shown below:

On the Title Page

Please insert Item:
-- (73) Assignee: ICE ENTERTAINMENT SA, Geneva, Switzerland (CH) --.

Signed and Sealed this
Eighteenth Day of September, 2018

Andrei Iancu
*Director of the United States Patent and Trademark Office*